Jan. 27, 1959    R. J. GUIRE ET AL    2,871,100
METHOD OF PREPARING INDIUM PHOSPHIDE
Filed July 22, 1955
Fig. 1.
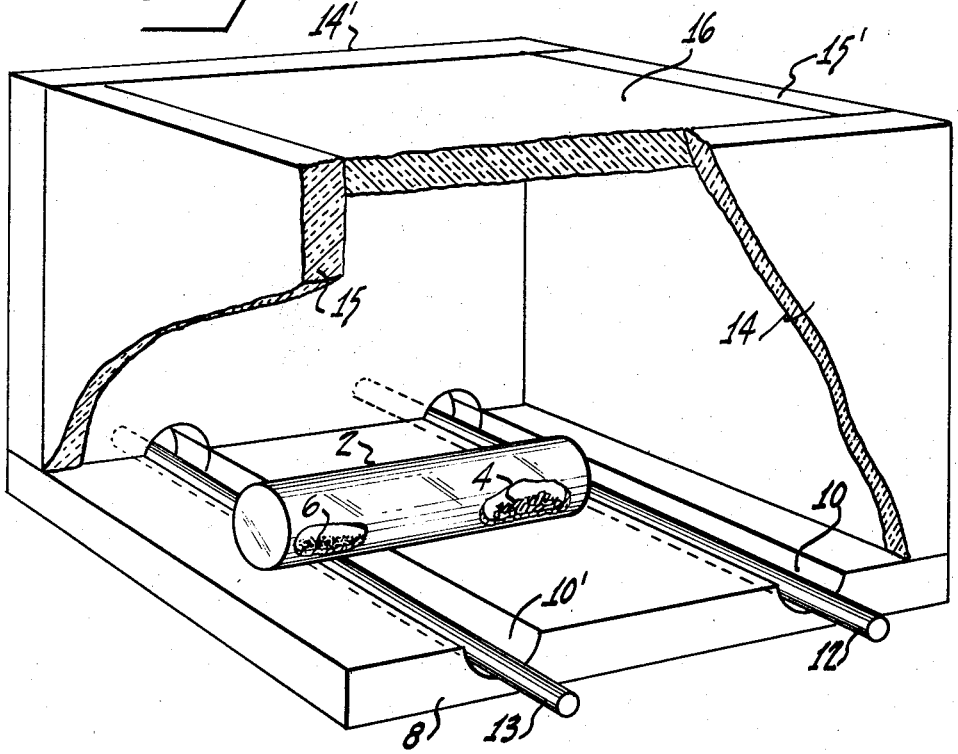
Fig. 2.
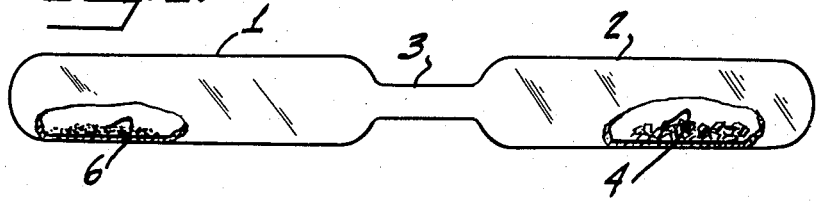
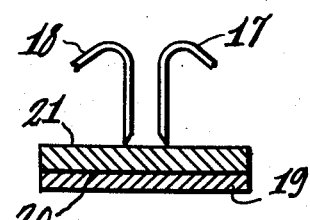
Fig. 3.
INVENTORS
RONALD J. GUIRE &
BY KURT WEISER
J. L. Whittaker
ATTORNEY

United States Patent Office 2,871,100
Patented Jan. 27, 1959

2,871,100

METHOD OF PREPARING INDIUM PHOSPHIDE

Ronald J. Guire, Columbus, and Kurt Weiser, Princeton, N. J., assignors to Radio Corporation of America, a corporation of Delaware Application July 22, 1955, Serial No. 523,718

5 Claims. (Cl. 23—204)

This invention relates generally to improved semi-conductive materials and devices, and to improved methods of preparing them in crystalline form. More particularly, but not necessarily exclusively, the invention relates to an improved method for preparing semi-conductive intermetallic compounds in crystalline form, and to improved devices employing said compounds.

It is well known that semi-conductive germanium devices have rather stringent operating temperature requirements. This is due to the relatively small energy gap width of germanium which permits the electrons to be thermally excited from one energy level to another at temperatures not too much higher than room temperature. For this reason other semi-conductive materials having greater gap widths, and hence greater thermal stability, have been investigated. One material having a suitable energy gap width is silicon; others are the intermetallic compounds such as aluminum antimonide, gallium arsenide, and indium phosphide, to mention a few.

For most semi-conductor devices it is required that the semi-conductive material be in crystalline, preferably single crystalline, form. Such crystals are preferably prepared by solidification from a melt of the compound or element. Otherwise many interesting semi-conductive intermetallic compounds however are unstable and decompose at their melting point and some at temperatures lower than the melting point. The problem of producing such compounds in crystalline form thus is exceedingly difficult and this difficulty is greatly increased in the case of compounds at least one of the elements of which readily volatilizes at temperatures only slightly above or anywhere below the melting point.

It is therefore an object of this invention to provide an improved method for preparing crystals of a compound from a melt thereof which compound decomposes at temperatures not higher than slightly above the melting point thereof into elements at least one of which is volatile at ordinary atmospheric pressures, and to provide improved devices including said crystals.

A further object of the invention is to provide an improved method for preparing crystals of a semi-conductive compound useful for transistors and other semi-conductive devices from a melt of said compound which decomposes at temperatures not higher than slightly above the melting point thereof at ordinary atmospheric pressures into elements at least one of which is volatile.

Another object of the invention is to provide an improved method for preparing crystalline indium phosphide from a melt thereof while preventing the escape of phosphorus from the melt.

Still another object of the invention is to provide an improved method for preparing crystalline indium phosphide of such size as to be useful in transistors and other semi-conductive devices, from a melt of indium phosphide.

Another object of the invention is to provide an improved method for preparing crystalline ingots of indium phosphide of any desired size from a melt of indium phosphide.

Another object of the invention is to provide an improved method for preparing relatively perfect and larger crystals of indium phosphide from a melt thereof.

These and other objects and advantages of the invention are obtained by melting a compound such as indium phosphide, for example, and then slowly cooling the melt under a temperature gradient from one end of the melt to the other and vapor pressure of the volatile element (phosphorus in the case of indium phosphide) above ordinary atmospheric pressure. A proper vapor pressure of the volatile element maintained in the space above the surface of the melt prevents the escape of the volatile element from the melt and maintains at least equivalent amounts of the two elements in the melt during crystallization.

The invention will be described in greater detail with reference to the drawings in which:

Figure 1 is a perspective view, partly in section, of a suitable furnace for preparing crystalline indium phosphide according to the method of the invention;

Figure 2 is an elevational view of a pair of connected quartz ampules for preparing indium phosphide; and Figure 3 is a schematic, cross-sectional, elevational view of a device utilizing materials prepared according to the invention.

While the method of the invention is described herein with particular reference to the preparation of indium phosphide, the practice of the invention is by no means limited to preparing only this material. The invention may be practiced to advantage wherever it is desired to prepare a compound in crystalline form from a melt thereof which decomposes at a temperature only slightly above or lower than its melting point into elements at least one of which is volatile. Examples of such compounds which can be produced in relatively large crystalline masses according to the invention are phosphides, arsenides, chlorides, and selenides, to mention a few.

Referring to Figure 1, a quartz tube 2 having relatively thick walls to minimize the danger of explosions is evacuated and sealed-off. Within and at one end of the tube is a quantity 4 of indium in chunk-form, for example. Also contained within the tube and at the other end thereof is a quantity 6 of phosphorus, which may be either in powder form (as shown) or a condensation upon the walls of the container. The quantity of phosphorus depends upon the amount needed to react with the indium in a stoichiometric (in this case 1:1 atomic) ratio plus the amount required to give a pressure of phosphorus vapor of between 5–10 atmospheres (as based on Ideal Gas Laws and the molecularity of phosporus at the temperatures involved in the process of the invention as given in the International Critical Tables). Thus for a quantity of indium of 2 grams and assuming a maximum temperature of 1080° C. throughout the process, .60–.66 gram of phosphorus is required for an ampule having a volume of 10 cc.

The quartz tube 2 is contained in a relatively simple furnace which is adapted to heat either end of the tube selectively to any desired temperature. The furnace comprises a base 8 having troughs 10—10' extending thereacross and at right angles to the longitudinal axis of the tube 2. Within the troughs are elongated resistance heaters 12 and 13 known commercially as "globars." The resistance heaters are adapted to be controllably energized from an electric power source (not shown). The furnace comprises the base 8, side walls such as 14, 14' and 15, 15' and a cover 16 all of which may be of firebrick or other heat-insulating material and arranged to surround the heat sources 12 and 13 as well as the quartz tube 2. It should be understood that the furnace and arrangement shown are merely for convenience of illustrating the principle of the method of the invention. Other suitable furnaces and modifications may be readily designed to carry out the invention.

It is preferred to heat only the end of the tube containing the indium to a temperature (1080° C.) at which it will readily react with phosphorus and at which the compound formed will become and remain molten. However, if desired, the speed of reaction may be reduced by heating the indium to a lower temperature (at least 900° C.) in which case the compound formed (indium phosphide) will be a solid.

Since the phosphorus is at the other and hence cold end of the tube no reaction will occur until it is brought into contact with the hot indium. This is accomplished by heating the phosphorus to vaporize it at a temperature high enough to provide a phosphorus vapor pressure (a few mm. of mercury) to allow a reasonably fast yet safe reaction with indium. Too high a vapor pressure will result in bursting the ampule or tube 2. The preferred temperature to form the desired reaction vapor pressure is about 400° C.

Upon completion of the reaction the indium phosphide formed is either molten or solid depending upon the temperature at which the indium was held as explained previously. If the reaction occurred at a temperature of 900° C. then the solid indium phosphide must now be melted. This is accomplished by raising the temperature to about 1080° C. In either case, the compound is unstable at its melting point and readily decomposes into its constituents. According to the method of the invention as explained hereinafter the indium phosphide should preferably be molten in order to produce the phosphide in crystalline form such as is useful for semiconductor devices. The decomposition of the phosphide would not present a problem if both elements remained in the melt. The phosphorus, however, being highly volatile, escapes from the melt. The purpose of having an excess amount of phosphorus within the ampule is now evident. The relatively cold end or phosphorus end of the tube is now heated to further vaporize the excess phosphorus to provide a phosphorus vapor pressure in the tube of at least about 3 atmospheres. The presence of phosphorus vapor at such a pressure effectively prevents the escape of phosphorous from the melt. However, best results in terms of crystalline perfection were obtained with a phosphorus vapor pressure of between 5–10 atmospheres. Too great a phosphorus vapor pressure tends to result in porous crystals due to occlusion of phosphorus and increases the danger of explosions; insufficient vapor pressure fails to contain the phosphorus in the melt and also results in a highly polycrystalline mass.

Upon the establishment of the proper phosphorus vapor pressure the melt is ready to be slowly cooled so as to result in the formation of solid crystalline indium phosphide. To do this it is necessary to establish a temperature gradient in the indium phosphide melt which is conveniently accomplished by having one end of the melt nearer the heat source 12, for example, than the other as opposed to having the whole melt directly exposed to the heat source. As shown in Figure 1 this is brought about simply by placing the ampule 2 with its indium phosphide end at about the edge of the trough 10. In practice it was found that the best results were obtained with a preferred gradient of about 100° C. per cm. along the melt and having the coldest end of the melt just at the melting temperature of about 1080° C. The purpose of the gradient is to prevent the freezing (due to super-cooling) of more than just a very small tip at the cold end of the melt; otherwise a mass of many small crystals results. The preferred rate of crystal growth is about 0.5 mm. per hour and this rate is attained by slowly lowering the overall temperature about 5°–6° C. per hour. The frozen mass is composed of large, nearly perfect grains of indium phosphide.

It should be understood that for the best results relatively pure indium and phosphorus must be provided ab initio. A convenient method for preparing an ampule for use according to the invention containing pure and unreacted indium and phosphorus will now be described with reference to Figure 2. The purest grade of indium is selected. Such indium is obtainable by zone-melting an indium ingot which segregates the impurities therein at one end of the indium as is well known in the art. The indium is weighed to the desired amount, and then heated in vacuo to drive off any indium oxide. The pure indium 4 is then placed in the ampule 2 which is connected to another ampule 1 by the small tubing 3. The phosphorus is purified by boiling it in a 10% solution of KOH to free it of any oxides, and thereafter washed and dried. The phosphorus is then placed in the other ampule 1, dried, and both ampules 1 and 2 are evacuated and sealed off. The phosphorus is thereafter distilled over from its ampule 1 into the ampule 2 containing the indium where it condenses upon the coldest surfaces. By appropriate heating and chilling of the ampule 2 the phosphorus is made to condense in the end of the ampule farthest from the indium. The ampule 2 is then sealed off at the point of entry of the connecting tube 3 and is ready for carrying out the steps of the method according to the invention for producing crystalline indium phosphide as described.

Indium phosphide crystals in cylindrical ingots of 2–3 grams have been obtained by the method according to the invention. These ingots were approximately 2–3 cm. in length with a diameter of about 0.5 cm. Larger and longer ingots can be obtained by employing larger ampules and furnaces.

A typical semi-conductive transistor device comprising a semi-conducting body of indium phosphide, for example, is shown in Figure 3. To one surface of a wafer 21 of indium phosphide an electrical lead 19 is bonded by means of a non-rectifying solder connection 20. Upon the opposite surface of the wafer two closely spaced relatively hard, pointed metallic wires 17 and 18 are pressed. The ends of the wires are sharpened to chisel points so that the areas of contact between the wafer and the wires are minimized. The ends of the wires contact the wafer at two points about .0005″ apart. One of the wires may be employed in a circuit as an emitter electrode, the other wire as a collector electrode, and the lead 19 may conveniently serve as a base connection. Alternatively one of the electrodes 17 and 18 may be omitted to make a rectifier device.

Wherever the specification or appended claims refer to "preventing the escape" of phosphorus or other volatile element from the melt, it should be understood that replacement of escaped phosphorus by the surrounding phosphorus vapor is also intended to be included.

What is claimed is:

1. The method of preparing crystalline indium phosphide comprising the steps of: heating a quantity of indium at one end of an evacuated container to a temperature at which indium reacts with phosphorus, independently and separately heating a quantity of phosphorus in said container at the other end thereof to the temperature at which a sufficient phosphorus vapor pressure is obtained at which said indium reacts with said phosphorus to produce indium phosphide, further heating an additional quantity of phosphorus at said other end of said container in excess of that needed for said reaction so as to provide a phosphorus vapor pressure in said container, of at least three atmospheres, maintaining a melt of said indium phosphide under said phosphorus vapor pressure, said phosphorus vapor pressure being sufficient to prevent the escape of said reacted phosphorus from said melt, establishing a temperature gradient in said melt from one end to the other, and thereafter slowly freezing successive portions of said melt proceeding from the coldest to the hottest portions thereof whereby a mass of relatively large crystalline portions of said indium phosphide is obtained.

2. The method according to claim 1 wherein said melt of indium phosphide is maintained under a phosphorus vapor pressure of between 5–10 atmospheres.

3. The method of preparing crystalline indium phosphide comprising the steps of: heating a quantity of indium at one end of an evacuated container to a temperature of at least 900° C., independently and separately heating a quantity of phosphorus at the other end of said container to a temperature of about 400° C. whereby said phosphorus vaporizes and reacts with said indium to form indium phosphide, further heating an additional quantity of phosphorus at said other end of said container in excess of that needed for said reaction so as to provide a phosphorus vapor pressure of between 5–10 atmospheres, maintaining a melt of said indium phosphide under said phosphorus vapor pressure and establishing a temperature gradient in said melt, and thereafter slowly cooling said melt so that successive portions thereof are solidified from the coldest to the hottest portions thereof whereby a relatively large crystalline mass of said indium phosphide is obtained.

4. The method of preparing crystalline indium phosphide comprising the steps of: heating a quantity of indium at one end of an evacuated container to a temperature of at least 1080° C., independently and separately heating a quantity of phosphorus at the other end of said container to a temperature of about 400° C. whereby said phosphorus vaporizes and reacts with said indium to a 1:1 ratio to form molten indium phosphide, further heating an additional quantity of phosphorus at said other end of said container in excess of that needed for said reaction but limited to an amount which will give a pressure of 5–10 atmospheres when completely vaporized, said indium phosphide melt being maintained under said phosphorus vapor pressure, establishing a temperature gradient in said melt, and thereafter slowly cooling said melt so that successive portions thereof are solidified from the coldest to the hottest portions whereby a relatively large crystalline mass of said indium phosphide is obtained.

5. The method according to claim 4 wherein said temperature gradient is about 100° C. per cm. along said melt and said melt is slowly cooled at about 5°–6° C. per hour.

References Cited in the file of this patent

UNITED STATES PATENTS

| | | |
|---|---|---|
| 1,893,296 | Lilliendahl, et al. | Jan. 3, 1933 |
| 2,701,326 | Pfamm et al. | Feb. 1, 1955 |

OTHER REFERENCES

American Chemical Society, Aluminum Phosphide, Preparation and Composition, White et al., vol. 66, October 1944, pages 1666–1672.

Gazetta Chimicia Italiana, Concerning the Structure of the Compounds, InP, InAs, and InSb, Ando Iandelli, vol. 71, No. 1, 1941, pages 58–62.